(12) United States Patent
Oda et al.

(10) Patent No.: US 8,175,910 B2
(45) Date of Patent: May 8, 2012

(54) MARKETING ALLOCATION REQUEST SYSTEMS

(75) Inventors: Lisa Oda, San Carlos, CA (US); Shilpa Chen, San Jose, CA (US); Don Michael Berry, II, San Carlos, CA (US); Anant D. Uttarwar, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 711 days.

(21) Appl. No.: 11/940,538

(22) Filed: Nov. 15, 2007

(65) Prior Publication Data
US 2009/0132303 A1    May 21, 2009

(51) Int. Cl.
*G06F 17/00* (2006.01)
(52) U.S. Cl. ...................................................... 705/7.29
(58) Field of Classification Search ............... 705/10, 705/7.29
See application file for complete search history.

(56) References Cited

U.S. PATENT DOCUMENTS

2006/0161884 A1 * 7/2006 Lubrecht et al. .............. 717/104
2007/0050198 A1 * 3/2007 Ledford et al. .................... 705/1

FOREIGN PATENT DOCUMENTS

WO    WO 0063824 A2 * 10/2000

* cited by examiner

*Primary Examiner* — Thomas Dixon
(74) *Attorney, Agent, or Firm* — Schwegman, Lundberg & Woessner, P.A.

(57) ABSTRACT

A computerized method and a system for marketing planning and marketing program development are provided. In example embodiments, the method may include receiving a marketing program proposal including program information. The method may also include facilitating a strategic review process of the marketing program proposal. The method may further include facilitating of a capacity review process of the marketing program.

24 Claims, 14 Drawing Sheets

LOG-IN PAGE ebay | PROGRAM REQUEST | MY PROGRAMS/PROJECTS | TOOL ADMIN | FAQ's |

MARs 2.0-U.S.                                                    MARs 2.0
                                                                 U.S.

HI SHILCHEN !!!
TODAY: 09/12/2007 12:41 PM
CURRENT QUARTER: Q3/2007

SEARCH [     ] GO

INIT

← 800

820

WELCOME TO THE MARs 2.0! (MARKETING ALLOCATION REQUEST SYSTEM)

KICK-OFF YOUR MARKETING PROGRAM OR INITIATIVE BY PROVIDING THE INFORMATION WHICH PERTAINS TO YOUR INITIATIVE

IN ORDER TO ENSURE COMPLETE REVIEW AND ALLOCATION OF RESOURCES, PLEASE KEEP THE FOLLOWING IN MIND:

- IS THE PROGRAM TIED TO A CORPORATE INITIATIVE?
- HAS BUDGET BEEN APPROVED/ ALLOCATED?
- WHAT IS THE SCOPE AND TIMING?
- WHICH CHANNEL RESOURCES ARE NEEDED (EMAIL, ONSITE ETC.) TO ENSURE SUCCESS?

YOU WILL RECEIVE AN AUTOMATED NOTIFICATION INFORMING YOU IF YOUR REQUEST HAS BEEN APPROVED

USE YOUR NT LOGIN/PASSWORD AND CLICK HERE TO GET STARTED: MARS 2.0 — 850

FOR ANY ISSUES OR QUESTIONS WITH THE USE OF THIS TOOL, PLEASE EMAIL TO MARSSUPPORT@EBAY.COM

MARS PROGRAM LEVEL

NEW PROGRAM REQUEST
ALL FIELDS MARKED WITH ASTERISK ARE REQUIRED.

- 1005 — PROGRAM INFORMATION
- 1010 — PROGRAM TITLE:*
- 1015 — DESCRIPTION: (SITE NAME AUDIENCE PROGRAM NAME QQYY)
- 1020 — OBJECTIVE:
- 1025 — CREATIVE CONSIDERATIONS:*
- 1030 — KEY MESSAGING:*
- 1035 — PERFORMANCE SUMMARY:
- 1040 — PROGRAM ATTACHMENTS: FILES: BROWSE — 1050
- 1045 — PROJECT TYPE(S): ☐ BRANDING/CORPORATE ☐ CTM INTERSTITIAL ☐ EMAIL ☐ GRAPHIC ☐ PAGE
  ☐ PRINT ☐ PRODUCTION ☐ RICH MEDIA

STRATEGIC INITIATIVE:* –SELECT INITIATIVE– — 1060
START DATE:* (mm/dd/yyyy) — 1065
END DATE:* (mm/dd/yyyy) — 1065
INCENTIVE/CONTRA REVENUE($) APPROVED?*
  ◉ NO ○ YES  AMOUNT?:
MARKETING BUDGET ($) APPROVED?*
  ◉ NO ○ YES  AMOUNT?:
PURPOSE: ☐ AWARENESS ☐ ACTIVITY
  ☐ ACTIVATION ☐ ADOPTION
  ☐ RETENTION ☐ OTHER 1080 — REQUESTOR INFORMATION
SHILPA CHEN (408-376-8815)
BUSINESS UNIT:* –SELECT BUSINESS UNIT–

NOTIFY [          ] [VERIFY & ADD]

MARS 2.0 PROJECT INFORMATION — 1210

GRAPHIC ITEMS:

PLACEMENTS* — 1220  1222  1224  1226  1228  1229  1230

| | DELIVERY* | TARGETING* | RTM/ BOOM LIST | PUBLISH DATE:* (mm/dd/yyyy) | PUBLISH END DATE:* (mm/dd/yyyy) | |
|---|---|---|---|---|---|---|
| -SELECT PLACEMENT- ▽ | DBCLK ▽ | ☐ BOOM ☐ ROS ☐ RTM | | | | ✕ |

ADD MORE — 1240

TRAFFICKING NOTES: — 1242

FREQUENCY CAP: ☐ PER -SELECT- ▽

BROWSE — 1250

MPOs ATTACHMENTS:

LINKING URLs: — 1244

ADD LIST — 1254

1252

SAVE & DONE — 1260
CANCEL UPDATES — 1262
SAVE & ADD VERSION — 1264

MARKETING ALLOCATION REQUEST SYSTEMS

TECHNICAL FIELD

Example embodiments relate generally to technical field of data management, and in one specific example, to marketing allocation request systems.

BACKGROUND

Marketing is one of the most important parts of the daily activities of almost all major businesses. Strategic marketing may focus on how an organization would compete against its competitors in the marketplace and how a competitive edge could be created with respect to its competitors. At a practical level, operation marketing may attempt to attract more and more customers into its customer pool and contemplate ways of deriving the maximum value from the existing customers, as well as approaches to achieve more customer satisfaction by, for example, meeting customer expectations and providing prompt services.

BRIEF DESCRIPTION OF THE DRAWINGS

Some embodiments are illustrated by way of example and not limitation in the figures of the accompanying drawings in which:

FIG. 8 shows a screenshot illustrating an example embodiment of a Web page for logging into the marketing allocation requirement system;

FIG. 9 shows a screenshot illustrating an example embodiment of a page used for defining a strategic marketing program proposal;

FIG. 10 shows a screenshot illustrating, in an example embodiment, a page for initiating and viewing the marketing allocation requirement system programs;

FIG. 11 shows a screenshot illustrating an example embodiment of a page for viewing the marketing allocation requirement system project level information;

FIG. 12 shows a screenshot illustrating, in an example embodiment, a page including more details of the marketing allocation requirement system project;

FIG. 13 shows a screenshot illustrating, in an example embodiment, a page for a user to view the user's programs and projects.

DETAILED DESCRIPTION

Figure 1:
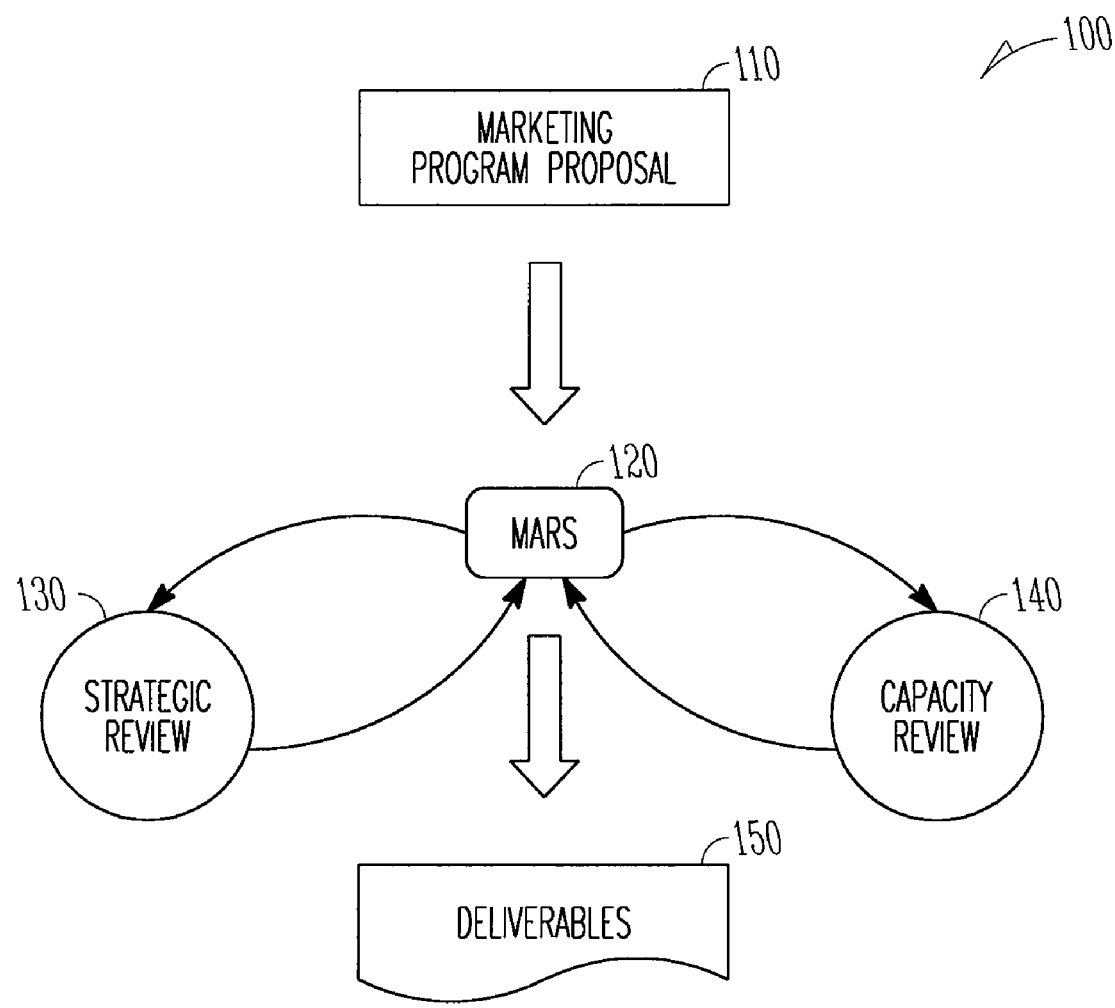
FIG. 1 is a high-level diagram illustrating, in an example embodiment, functionality of a marketing allocation requirement system (MARS)

Example methods and systems for marketing planning and marketing program development have been described. In the following description, for purposes of explanation, numerous specific details are set forth to provide a thorough understanding of example embodiments. It will be evident, however, to one skilled in the art that the present invention may be practiced without these specific details.

For the purpose of present application, the term "marketing program" shall be taken to include, but not be limited to, a program including one or more projects directed to a marketing campaign (e.g., a marketing effort to promote a product or a service).

For the purpose of present application, the term "marketing program proposal" shall be taken to include, but not be limited to, a proposal including a marketing program.

For the purpose of present application, the term "strategic review" shall be taken to include, but not be limited to, a review process performed based on one or more defined strategies (e.g., reviews performed by strategists or high ranking officials such as officers of a corporation).

For the purpose of present application, the term "capacity review" shall be taken to include, but not be limited to, a review process performed based on availability of resources (e.g., a review by a marketing manager).

The example marketing allocation and requirement system, as discussed below, may operate an end-to-end marketing planning tool for managing resources, timelines, and projects. Information submitted into the system can be retrieved in various formats depending on the user and may be reformatted into a desired version (e.g., calendars, budgets, planning, etc.). The tool may be scalable and may be useful in managing marketing from strategic initiative level (e.g., set at the corporate level) all the way down to production level, by providing visibility, accountability and management of programs/projects. Example embodiments may provide a marketing view to understand which programs/projects are most effective and should be used for future campaigns.

The example system may include a built-in scoring system for various stakeholders to provide feedback on projects processed and managed by the system. A "red/yellow/green" rating system (along with the ability to leave comments) may allow users to quickly assess projects that are approved versus those projects that may need additional research or discussion. This online feature reduces the need for large, lengthy meetings and may cut decision making times appreciably.

Furthermore, an example system may span an organization from the strategy level all the way down to the tactical arena. Because of the way the system may be built, one may tie strategy to tactics and monitor return on investment (ROI) from a very high or low level without requiring any probing or customization on the part of the user.

Some embodiments described herein may include a computerized method and system for marketing planning and marketing program development. The method may include receiving a marketing program proposal that includes program information. Furthermore, a strategic review of the marketing program proposal process may be facilitated. The strategic review process may include determining whether the marketing program proposal is approved. Subject to the approval of the marketing program proposal, a marketing program developed based on the marketing program proposal may be received. The method may also include facilitating of a capacity review process of the marketing program. Based on a determination that the marketing program is approved in the capacity review stage, management of the marketing program may be facilitated.

FIG. 1 is a high-level diagram illustrating, in an example embodiment, the functionality of a marketing allocation requirement system (MARS). The marketing allocation requirement system 120 may be a computerized system for facilitating a marketing planning and marketing program development discussed in detail below. The marketing allocation requirement system 120 may receive various initiatives including marketing program proposals 110 from various requesters who may want their initiative or proposal to be considered for review.

In a first review step, the marketing allocation requirement system 120 may facilitate a strategic review 130 by submitting the marketing program proposal to relevant entities (e.g., high-level authorities) and to solicit the entities' opinions and inputs on the proposed marketing program proposal 110. Once the results of the strategic review 130 is received and the marketing program proposals 110 is approved, the marketing allocation requirement system 120 may define a marketing program including various projects based on the marketing program proposals 110. The marketing program and the defined projects may then be sent for capacity review 140. The capacity reviewers, for example, may be project managers or the personnel who manage the task owners (e.g., marketing manager) in actual implementation of the projects.

The marketing allocation requirement system 120 may also implement the marketing program and projects at various stages and finally producing some creative deliverables 150. The creative deliverables 150 may then be trafficked through several delivery mechanisms.

Figure 2:
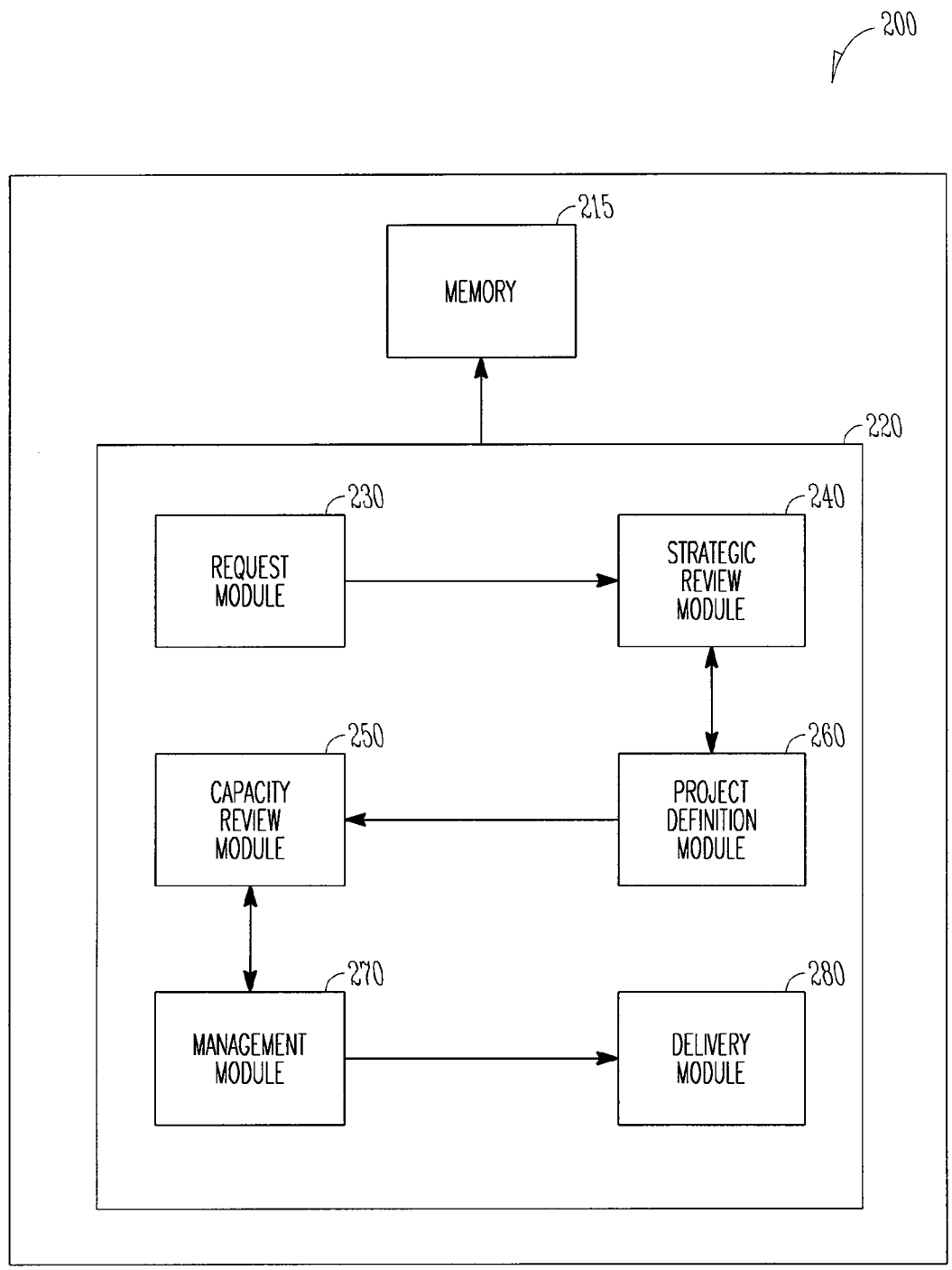
FIG. 2 is a block diagram illustrating, in an example embodiment, various modules of the marketing allocation requirement system.

FIG. 2 is a block diagram illustrating, in an example embodiment, a system 200 including various modules of the marketing allocation requirement system 120. In an example embodiment, the system 200 may include a memory 215 and a processor 220. The processor 220 may include a request module 230, a strategic review module 240, a capacity review module 250, a project definition module 260, a management module 270, and a delivery module 280.

The processor 220 may be coupled to the memory 215 to store or retrieve various data items. Data items, for example, may include data related to marketing plan proposals, marketing programs, projects, and deliverables such as drawings, copies, messages, task owners, deadlines, and the like.

According to example embodiments, in facilitating of the marketing, planning and marketing program development, the processor 220 may receive marking program proposals 110 including program information, via the request module 230. The request module 230 may receive marketing initiatives including the marking program proposals 110 from any employee of an organization. For example, the marketing initiatives may be sent by executives of the organization. The request module 230 may compile the initiatives in the memory 215 that then may be made accessible to reviewers and other users. In an example embodiment, the request module 230 may pass the marketing plan proposals 110 to the strategic review module 240.

Upon receipt of the marketing program proposals 110, the strategic review module 240 may start the strategic review 130 by submitting the marketing program proposals 110 to multiple reviewers for strategic review. The strategic review module 240 may then receive the strategic review results from the reviewers and for those marketing program proposals 110 approved by the reviewers, notify the project definition module 260. The strategic review module 240 may use a "red/yellow/green" rating system (along with the ability to leave comments) in the capacity review 140. The rating system may allow the users to quickly assess those projects that are approved versus those that may need additional research or discussions.

The project definition module 260 may facilitate defining of marketing programs and one or more projects related to each marketing program, based on the marketing program proposals 110. The projects defined for each marketing program may then be sent to the capacity review module 250, which may be responsible for facilitating the implementation of the capacity review process.

The capacity review module 250 may in turn send the projects defined for the marketing program to several capacity reviewers. Capacity reviewers may, for example, include stakeholders such as the project or department managers or various owners of tasks defined for carrying out the projects. The capacity review module 250 may use the "red/yellow/green" rating system (along with the ability to leave comments) in the capacity review 140. Any project that is not approved in the capacity review 140 may be sent back to the project definition module 260 for adjustments and corrections of the projects or redefinitions of new projects. Capacity reviewers may propose adjustments and corrections.

However, when a marketing program and the related projects are approved at the capacity review 140, the management module 270 may initiate the actual implementation and facilitate project management of the projects involved in the marketing program.

According to example embodiments, marketing programs and the related projects may include developing high-level details involved in the programs. The high-level details may include assigning program managers, allocating budget, defining objectives, setting deadlines, and the like. At the project level, the implementation of the projects may include managing tactical details (e.g., defining tasks, resources (e.g., task owners, and support people) timelines, etc.) and tying strategies to tactics including monitoring ROI from various levels.

In an example embodiment, the results of the implementation of the projects may include production deliverables 150, including creative deliverables. The creative deliverables may be transferred by the delivery module 280 to various delivery mechanisms. The delivery mechanism may include one or more e-mail deliveries, Web site developments, or publishing houses.

Figure 3:
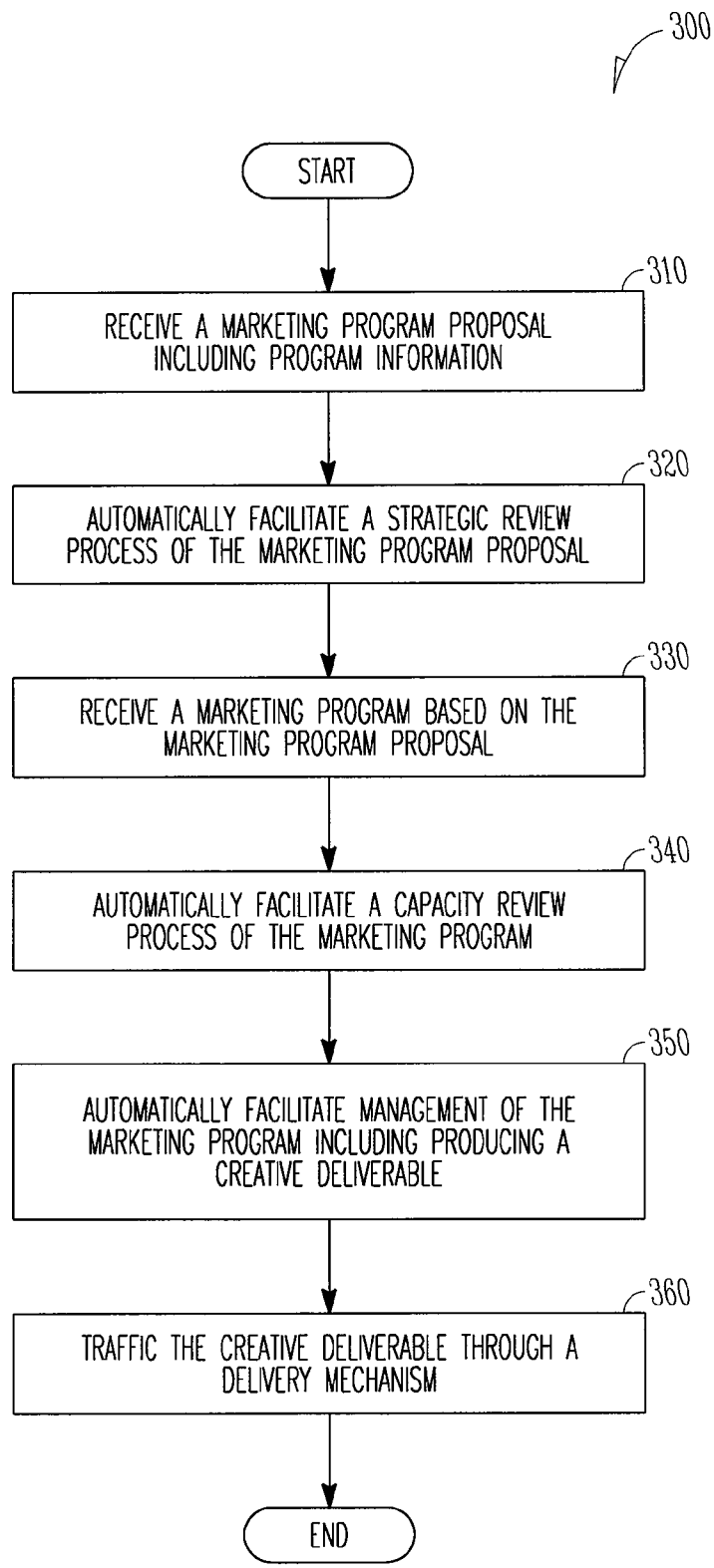
FIG. 3 is a flow diagram illustrating an example embodiment of a computerized method for facilitating of marketing planning, and marketing program development using the system of FIG. 1.

FIG. 3 is a flow diagram illustrating an example embodiment of a method 300 for marketing planning and marketing program development by the marketing allocation requirement system 120. According to the method 300, at operation 310, the request module 230 may receive marketing initiatives including marketing program proposals 110 from various requestors who may want their marketing initiatives to be considered for review. The marketing program proposals 110 may include program information. Program information may include one or more e-mails, Web site graphics, Web site pages, or print pieces.

At operation 320, the strategic review module 240 may facilitate a strategic review process on the marketing program proposals 110 by submitting the marketing program proposals 110 to various strategic marketing program proposal reviewers. In example embodiments, facilitating of the strategic review process may include disseminating the proposal to related parties (e.g., high-level authorities of the organization) for review and receiving review results from the related parties.

When any of the marketing program proposals 110 is passed the strategic review process and approved for further processing, at operation 330, the project definition module 260 may facilitate defining of a marketing program and one or more projects related to the marketing program, based on the specific marketing program proposal 110. The defined projects for the marketing program are then sent, at operation 340, for a capacity review 140 to multiple capacity reviewers of the projects.

Once the capacity reviewers approve a marketing program and related projects, at operation 350, the management module 270 may initiate actual implementation and facilitate management of the marketing program and the related projects. The end results of the implementation stage may include production of some deliverables 150 including creative deliverables. The creative deliverables may then, at the operation 360, be transferred via delivery module 280 through various delivery mechanisms (e.g., one or more e-mail deliveries, Web site developments, or publishing houses).

According to example embodiments, facilitating of the management of the marketing program by the management module 270 may include facilitating of developing a high-level detail involved in the program. Also, facilitating of management of the projects may include providing tools for managing tactical details including one or more resources or timelines, tying strategies to tactics including monitoring ROI from various levels, and producing creative deliverables.

Figure 4:
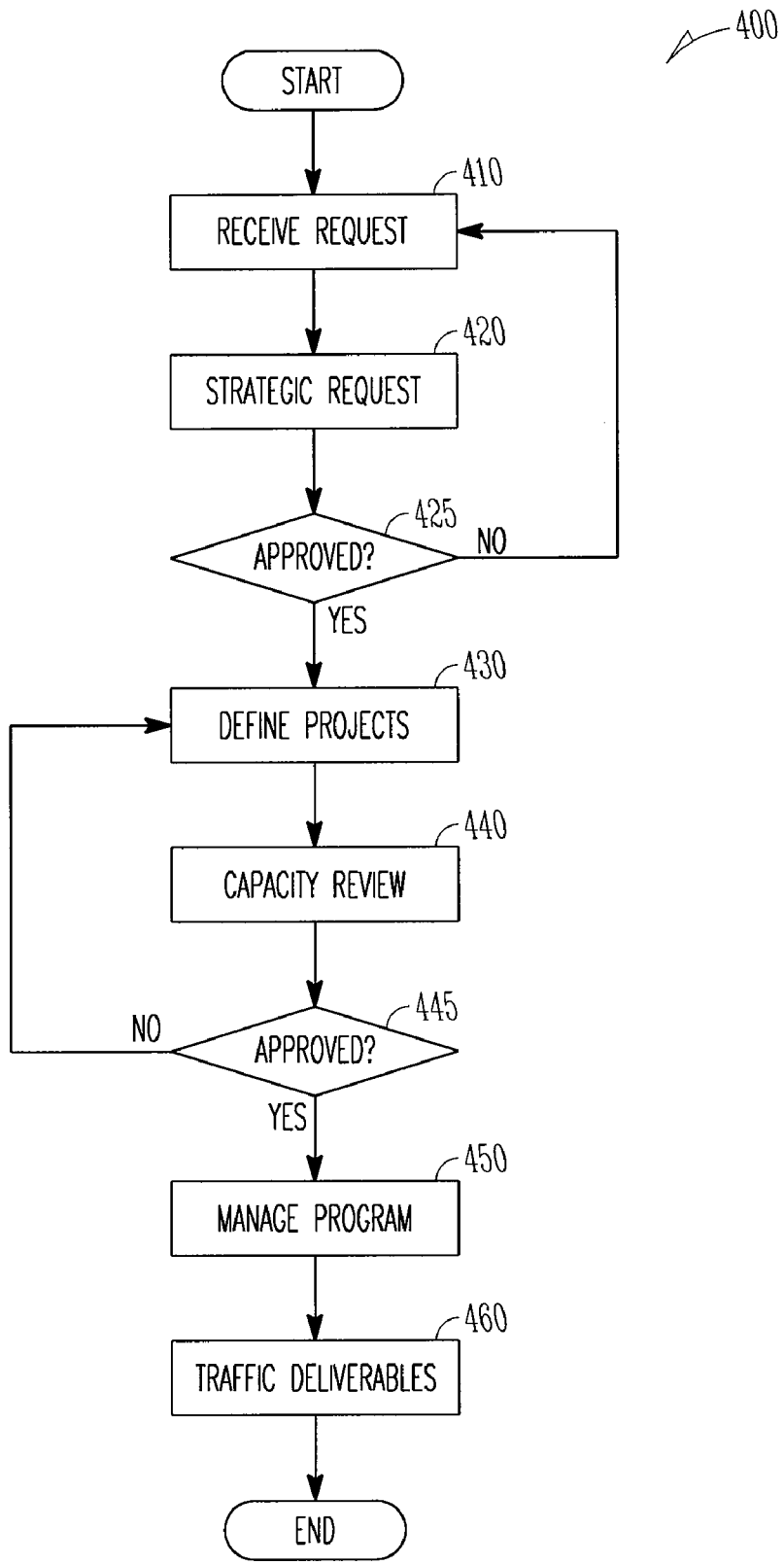
FIG. 4 is a flow diagram illustrating, in another example embodiment, a computerized method for facilitating of marketing planning and marketing program development.

FIG. 4 is a flow diagram illustrating, in an example embodiment, a method 400 for facilitating marketing planning and marketing program development. The method starts at operation 410, where the request module 230 may receive marketing program proposals 110. At operation 420, the marketing program proposals 110 may be sent for strategic review to various reviewers. At control operation 425, for those marketing program proposals 110 that failed to pass the strategic review 130, the control may be passed to the operation 410 for requesting additional proposals. Meanwhile, the strategic review module 240 may notify the requestor of the proposal that the marketing program proposal 110 proposed by the requestor has not passed the strategic review 130.

However, if a determination has been made at operation 425 that a marketing program proposal 110 has been approved at the strategic review 130, then the project definition module 260 at operation 430 may facilitate defining of a marketing program and one or more related projects for the marketing program. At operation 440, the defined projects are sent for capacity review. If, at the control operation 445, it is established that the marketing program and/or the related projects were not approved by the capacity reviewers, then the program and/or the projects may be sent back to the project definition module 260 for further consideration including correction and adjustments of the program and/or projects.

For the marketing programs and the related projects approved at the capacity review 440, the management module 270 may, at operation 450, initiate and facilitate implementation of the projects including using the feedback received from the capacity reviewers to finalize the project definitions and recording assigning of resources (e.g., task owners and budget) to the final marketing program and projects. The results of the implementation of the projects may include creative deliverables that, at operation 460, may be transferred to various delivery mechanisms.

Figure 5:
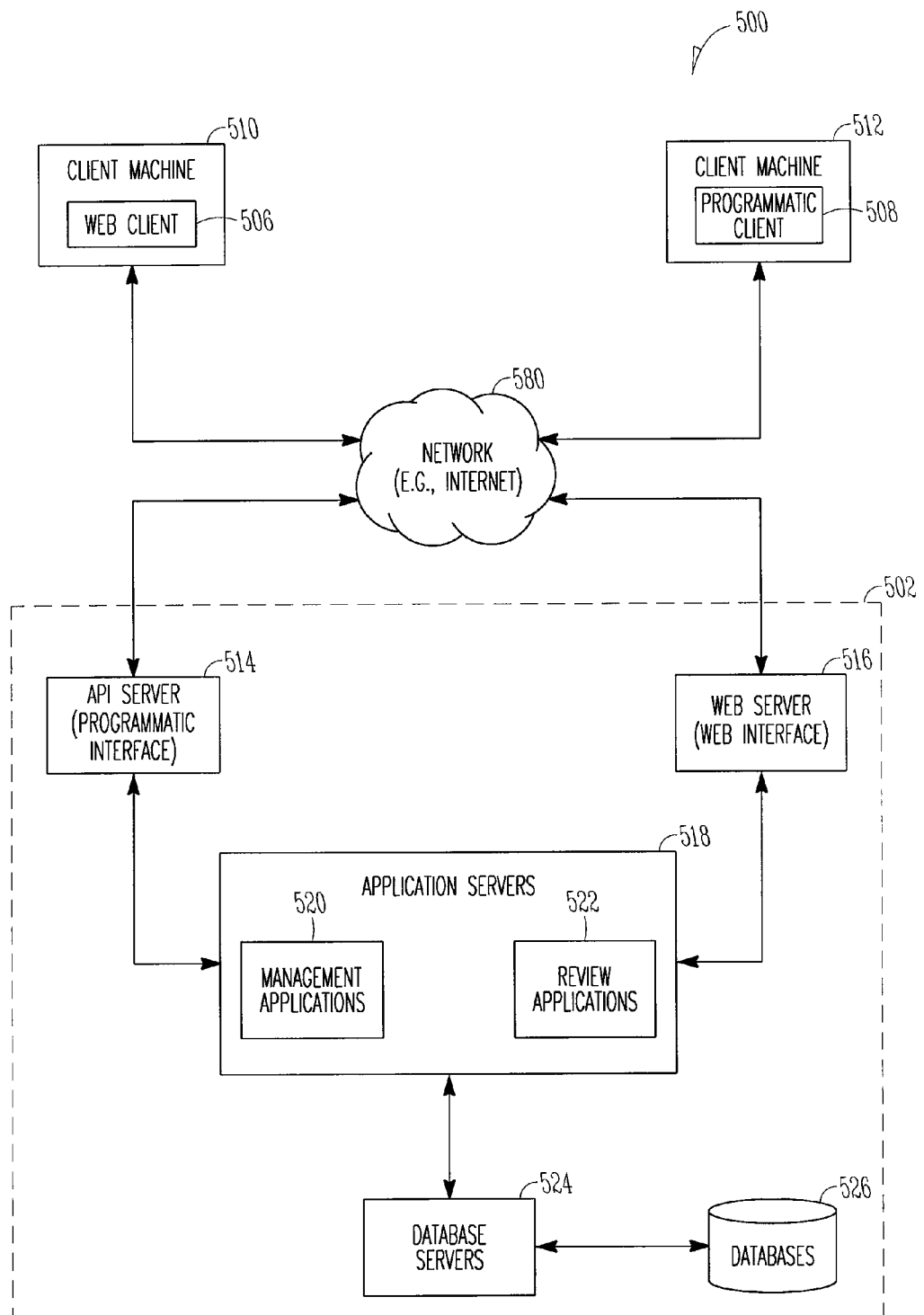
FIG. 5 is high-level block diagram illustrating an example embodiment of a network-based marketing planning and marketing program development system having a client-server architecture.

FIG. 5 is a high-level block diagram illustrating an example embodiment of a network-based marketing planning and development system 500, having a client-server architecture for facilitating review and management of marketing program proposals. A marketing planning platform, in the example form of a network-based marketing management system 502, provides server-side functionality, via a network 580 (e.g., the Internet) to one or more clients. FIG. 5 illustrates, for example, a Web client 506 (e.g., a browser, such as the INTERNET EXPLORER browser developed by MICROSOFT CORPORATION of Redmond, Wash.), and a programmatic client 508 executing on respective client machines 510 and 512.

Turning to the network-based marketing management system 502, an Application Program Interface (API) server 514 and a Web server 516 are coupled to, and provide programmatic and Web interfaces respectively to, one or more application servers 518. The application servers 518 host one or more management applications 520 and review applications 522. The application servers 518 are, in turn, shown to be coupled to one or more database servers 524 that facilitate access to one or more databases 526.

The management applications 520 provide a number of management functions and services to the marketing program and projects defined based on marketing program proposals 110 proposed by users that access the network-based marketing management system 502. The review applications 522 facilitates strategic review of the marketing program proposals 110 and the capacity review of the marketing programs and projects defined based on the marketing program proposals 110.

Further, while the system 500 shown in FIG. 5 employs a client-server architecture, the present application is of course not limited to such an architecture, and could equally well find application in a distributed, or peer-to-peer, architecture system. The various management and review applications 520 and 522 may also be implemented as standalone software programs, which do not necessarily have networking capabilities.

It should be appreciated that the Web client 506 may access the various management and review applications 520 and 522 via the Web interface supported by the Web server 516. Similarly, the programmatic client 508 accesses the various services and functions provided by the management and review applications 520 and 522 via the programmatic interface provided by the API server 514. The programmatic client 508 may, for example, be proposal request application to enable requesters to submit their proposal to the network-based marketing management system 502 in an off-line manner, and to perform batch-mode communications between the programmatic client 508 and the network-based marketing management system 502.

Figure 6:
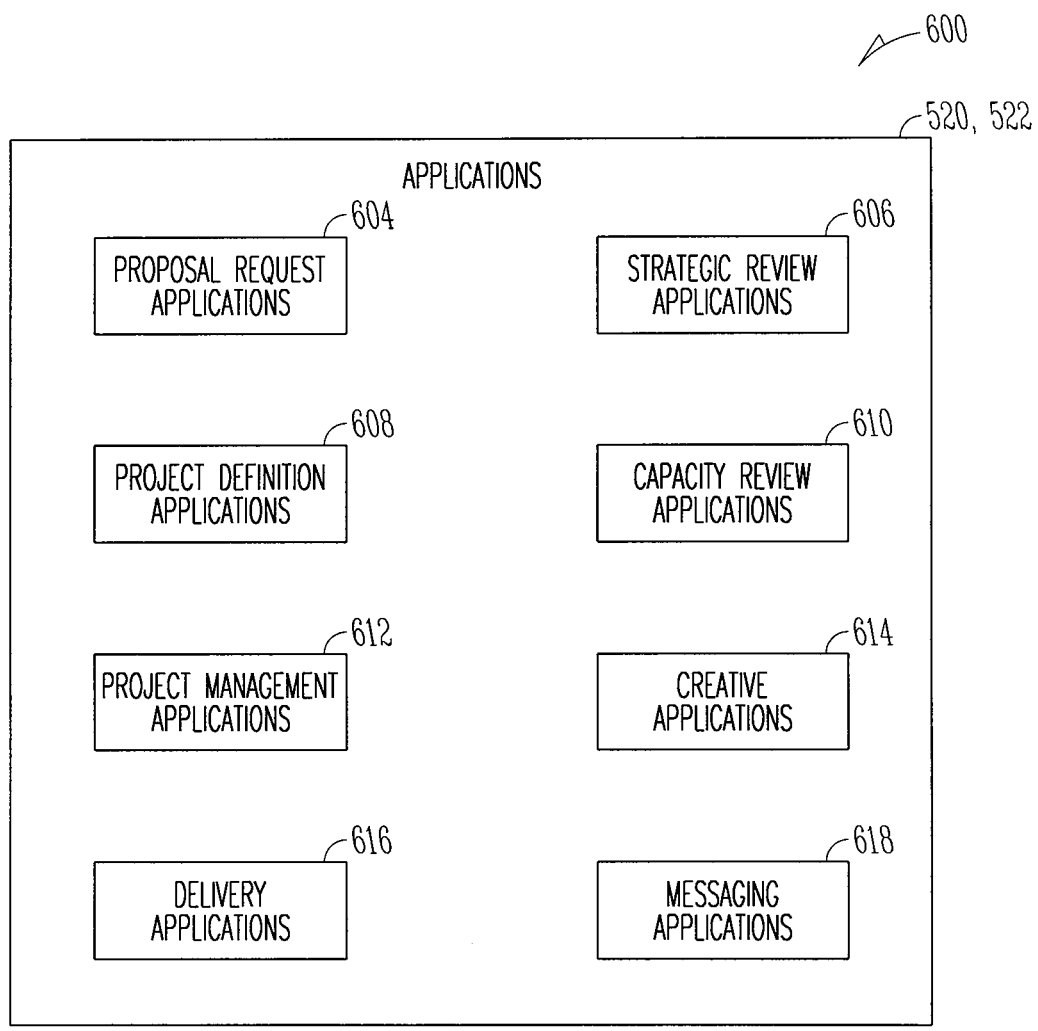
FIG. 6 shows an example set of management and review applications used by the network-based marketing planning and marketing program development system of FIG. 5.

FIG. 6 is a diagram illustrating example embodiments of applications 600 included in applications 520 and 522 served by the application server 518. Applications 600 may include a proposal request applications 604, strategic review applications 606, project definition applications 608, capacity review applications 610, project management applications 612, creative applications 614, delivery applications 616 and messaging applications 618.

The proposal request applications 604 may perform various services including receiving marketing program proposals 110 from programmatic clients 508 and/or Web clients 506. The strategic review applications 606 may facilitate the strategic review 130 of the marketing program proposals 110 received via the network 580 from various programmatic clients 508 or Web client 506. The strategic review applications 606 may use the messaging applications 618 to submit marketing program proposals 110 to various reviewers.

The project definition applications 648 may support defining projects for marketing programs based on the marketing program proposal 110. The capacity review applications 610 may receive information related to defined projects from the project definition applications 608 and communicate them via the messaging applications 618 to capacity reviewers for review. The project management applications 612 may provide various project management resources for implementing projects approved by the capacity review applications 610. Management applications 520 may also include creative applications 614 and publishing applications 660. The creative applications 614 may provide tools and support for creative producers who are assigned to design creative deliverables for the projects. The delivery applications 616 may facilitate publication of creative deliverables, for example, through Web sites, publishing houses, and messaging applications 618.

Example Machine Architecture

Figure 7:
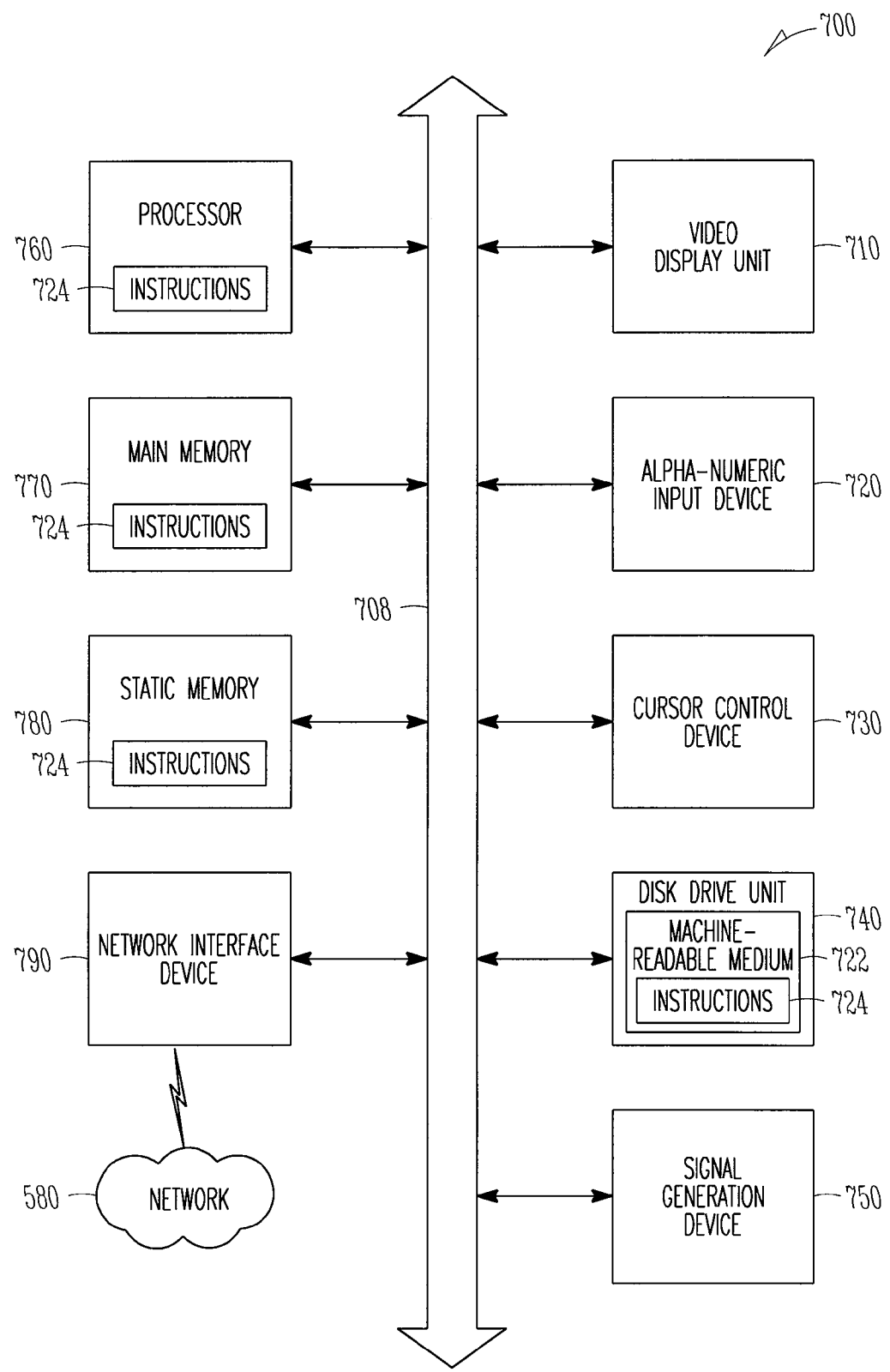
FIG. 7 is a block diagram illustrating a diagrammatic representation of a machine in the example form of a computer system.

FIG. 7 is a block diagram, illustrating a diagrammatic representation of machine 700 in the example form of a computer system within which a set of instructions for causing the machine to perform any one or more of the methodologies discussed herein may be executed. In alternative embodiments, the machine 700 may operate as a standalone device or may be connected (e.g., networked) to other machines. In a networked deployment, the machine 700 may operate in the capacity of a server or a client machine in a server-client network environment, or as a peer machine in a peer-to-peer (or distributed) network environment. The machine 700 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 760 (e.g., a central processing unit (CPU), a graphics processing unit (GPU) or both), a main memory 770 and a static memory 780, all of which communicate with each other via a bus 708. The computer system 700 may further include a video display unit 710 (e.g., liquid crystal displays (LCD) or cathode ray tube (CRT)). The computer system 700 also may include an alphanumeric input device 720 (e.g., a keyboard), a cursor control device 730 (e.g., a mouse), a disk drive unit 740, a signal generation device 750 (e.g., a speaker), and a network interface device 790.

The disk drive unit 740 may include a machine-readable medium 722 on which is stored one or more sets of instructions (e.g., software 724) embodying any one or more of the methodologies or functions described herein. The software 724 may also reside, completely or at least partially, within the main memory 770 and/or within the processor 760 during execution thereof by the computer system 700, the main memory 770 and the processor 760 also constituting machine-readable media.

The software 724 may further be transmitted or received over a network 580 via the network interface device 790.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

User Interfaces

FIG. 8 shows a screenshot illustrating an example embodiment of a login Web page 800 for logging into the marketing allocation requirement system 120. Any requester interested in proposing a marketing program proposal may log in to the marketing allocation requirement system 120 through the log-in Web page 800. The screen shot indicates that the program request tab 820 is active.

Figure 9:
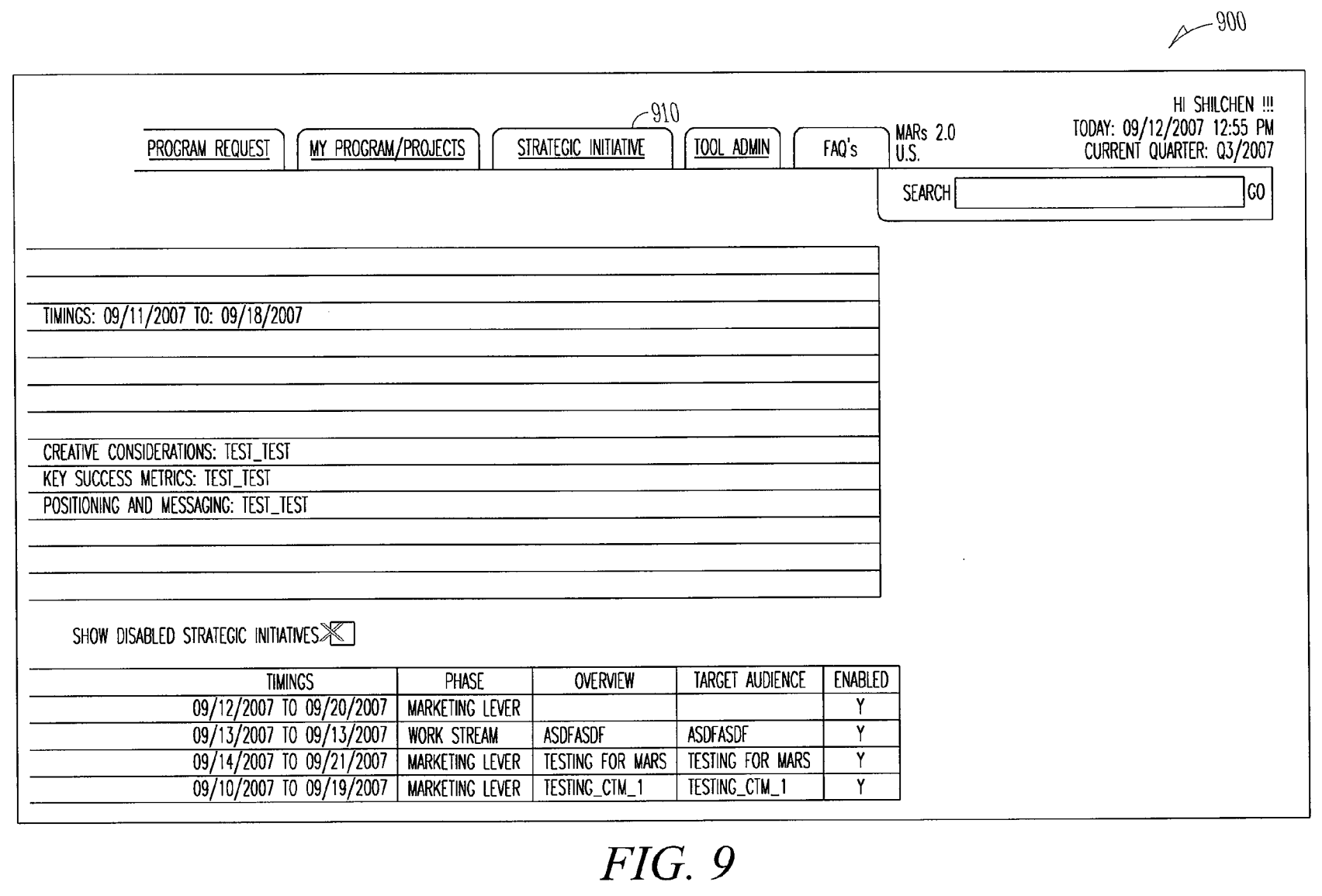

FIG. 9 shows a screenshot illustrating an example embodiment of a page 900 used for defining a strategic marketing program proposal. The page 900 indicates that by activating the strategic initiative tab 910, the requestor may view or create a strategic initiative overview 920 where the requester may enter the strategic initiative or corporate objective, in the provided spaces, including a name 915 a timing 920 (to designate a proper time period for the proposal may be entered); an overview 925 (to suggest a name for the overview); an objective 930, a target audience 935; a creative considerations item 940; a key success matrix 945; a positioning and messaging 950; a budget amount 955; and a modified by item 960 (automatically capturing the name of a person who modified the initiative). The page 900 may also include a checkbox 970 where the user may check to see a list of disabled strategic initiatives.

FIG. 10 shows a screenshot illustrating, in an example embodiment, a page 1000 for initiating and viewing the marketing allocation requirement system 120 programs. The page 1000 displays a new program request including program information 1005. The program requestor may fill out, in the allocated spaces, information including program a title 1010, a program description 1015, a program objective 1020, a creative considerations item 1025, a key messaging 1030, and a performance summary 1035. Note that asterisks adjacent to some of the fields indicate that the fields may be required to be filled out.

The program requestor may also use program attachments 1040 by clicking on a file browse button 1050 to see and select from the list of the program attachment files. The program requestor may also define project types 1045 by checking a box associated with a selected project type. The program requestor may also use a dropdown box 1060 to select a related strategic initiative. The program requestor may also designate a start and end date for a requested program in boxes 1065 and 1070, respectively. The information including name, telephone number, and business unit of the requestor are automatically captured by the system 1080.

Figure 11:
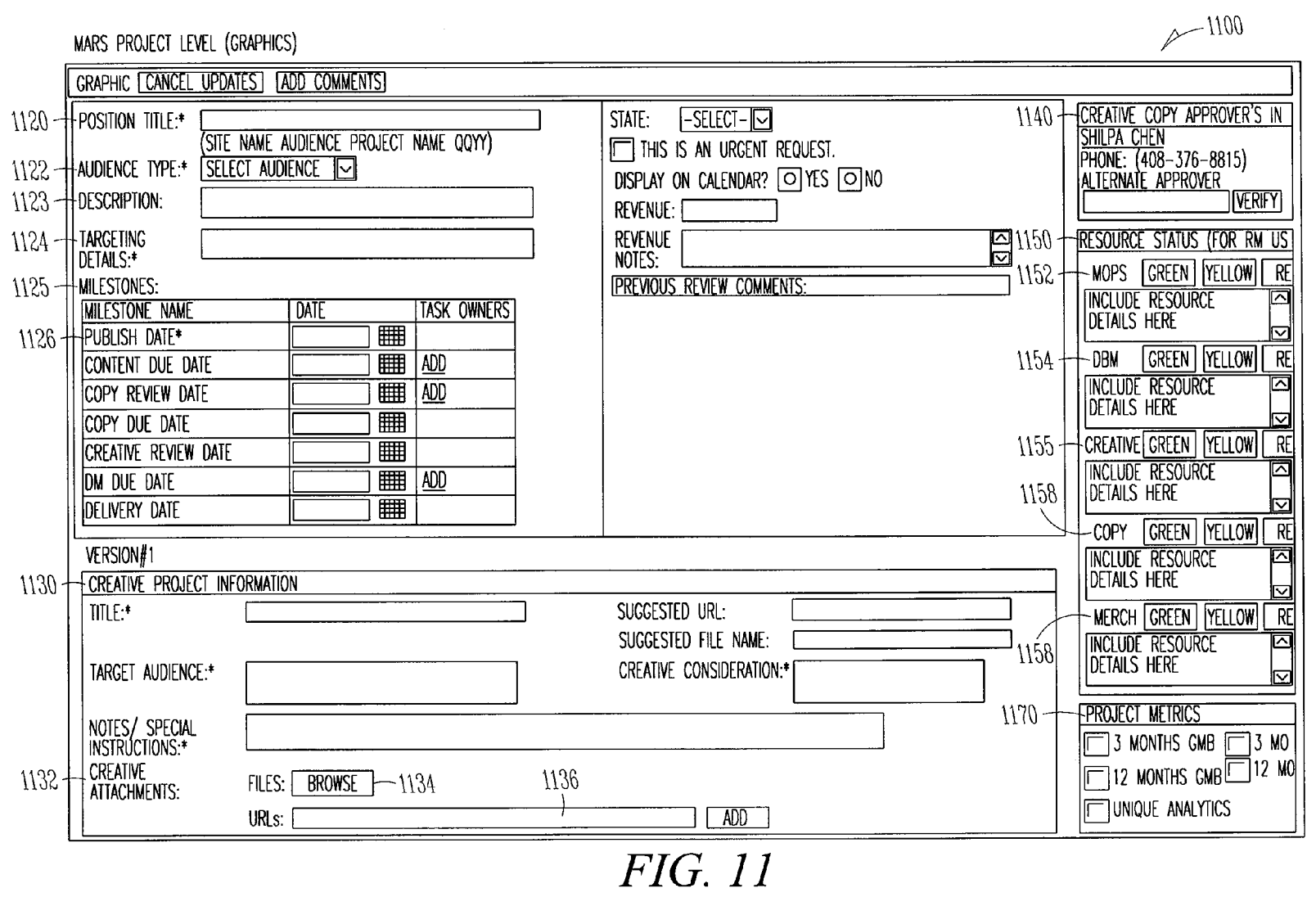

FIG. 11 shows a screenshot illustrating an example embodiment of a page 1100 for initiating and viewing the marketing allocation requirement system 120 project level information. At the marketing allocation requirement system project level page 1100, various project detail items including a project title 1120, an audience type 1122, a description 1123, a targeting details item 1124, and a milestones item 1125 can be viewed or entered. While the first publish date milestone 1126 may be entered by the user, the rest of the milestones would be filled automatically by the system.

The user may use creative project information 1130 to enter more detailed information regarding the creative projects. For example, the user may use the creative attachment portion 1132 to include creative attachments by selecting the attachments from a list of files selected, by either clicking on a browse button 1134 or by entering a corresponding URL in the address box 1136.

The page 1100 may also include the creative copy approvals information 1140 and the resource status 1150, where the status of resources for tasks including MOPS (Marketing Operations) 1152, DBM (database marketing) 1154, creatives 1155, copy 1156, and merchandising "the use of product imagery in marketing" 1158 are provided. The statuses may include a green, a yellow, or a red. Also, project metrics may be entered in the boxes under project metrics 1170.

FIG. 12 shows a screenshot illustrating, in an example embodiment, a page 1200 including marketing allocation requirement system project at a more detailed level. The MARS 2.0 project information box 1210 may include graphics items 1220 including tabs for placement 1222, delivery 1224, targeting 1226, Real time messaging RTM list 1228, publish date 1229, and publish end date 1230. The users may also use the add more button 1240 to add more placements (1222 through 1230), including trafficking notes 1242, or add MOPS attachments 1244 by either clicking on the browse button 1250 to select a desired file or entering a URL link in the address box 1252 and clicking on the add URL button 1254. Page 1200 also includes a save and done button 1260, a cancel updates button 1262, and a save and add version button 1264, which allows for a variation of the detailed portion of the project to be entered.

Figure 13:
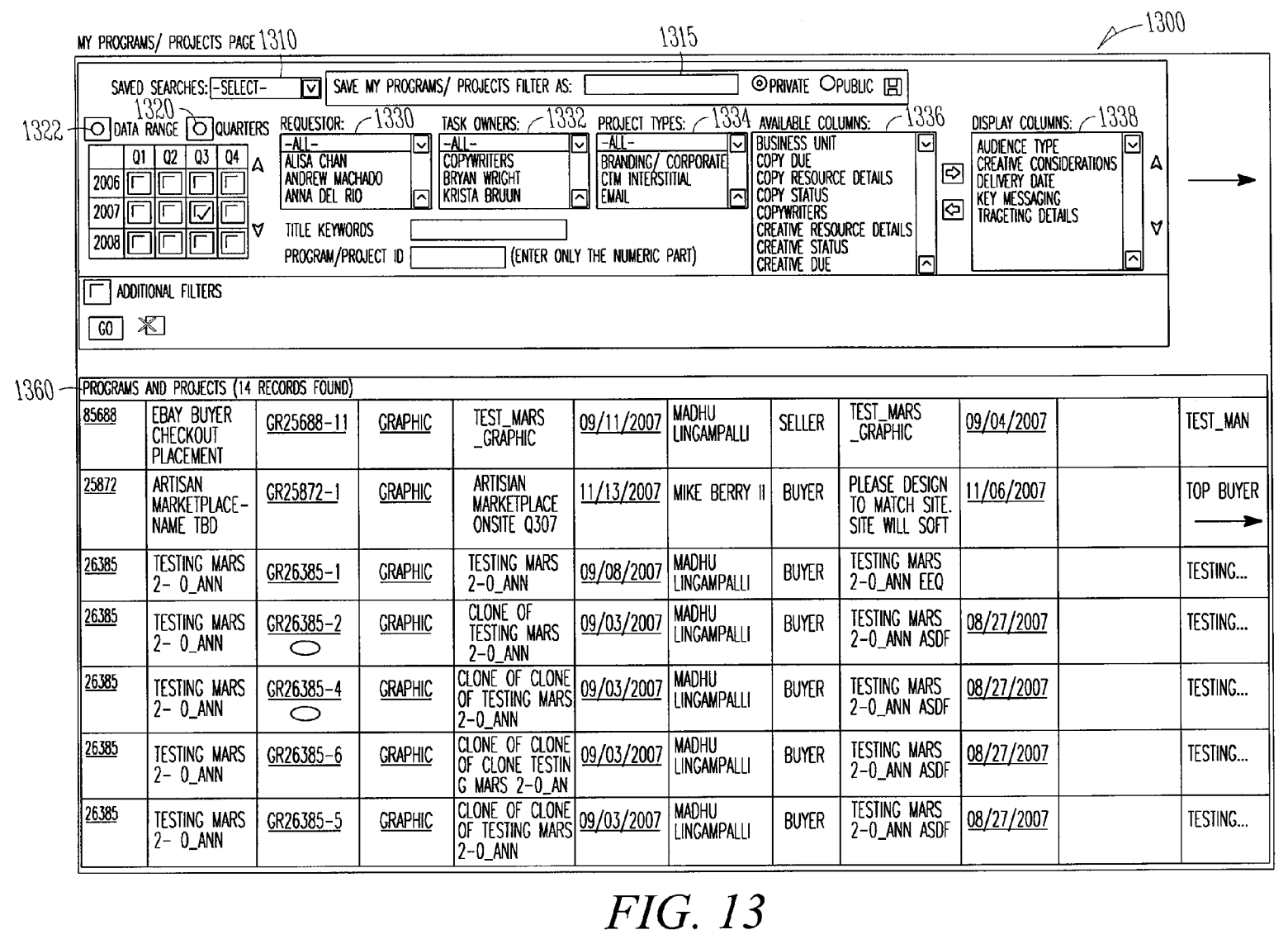

FIG. 13 shows a screenshot illustrating, in an example embodiment, a page 1300 for viewing any or a specific user's programs and projects. A user may use page 1300 to select from a list of saved searches using the dropdown box 1310. The user may set some criteria for the programs or projects that the user may want to review. For example, the user may enter a request submission date range 1322 or quarters 1320. In the example shown where the quarters 1320 is selected, selection boxes for quarters one to four of years 2006 to 2008 are provided, where the user has selected quarter three of 2007. The other criteria may be a requestor's name, which can be selected from the dropdown box 1330.

The user may also specify a task owner or project type by selecting from dropdown boxes 1332 and 1334 under task owners and project types, respectively. The information related to the selected programs may be viewed on the programs and projects list 1360, where the information may be shown in a matrix formed by series of columns and rows. Available columns are listed in the selection box 1336 where the user may select the desired column items and add them to the display columns 1338 for display on the programs and projects list 1360.

Figure 14:
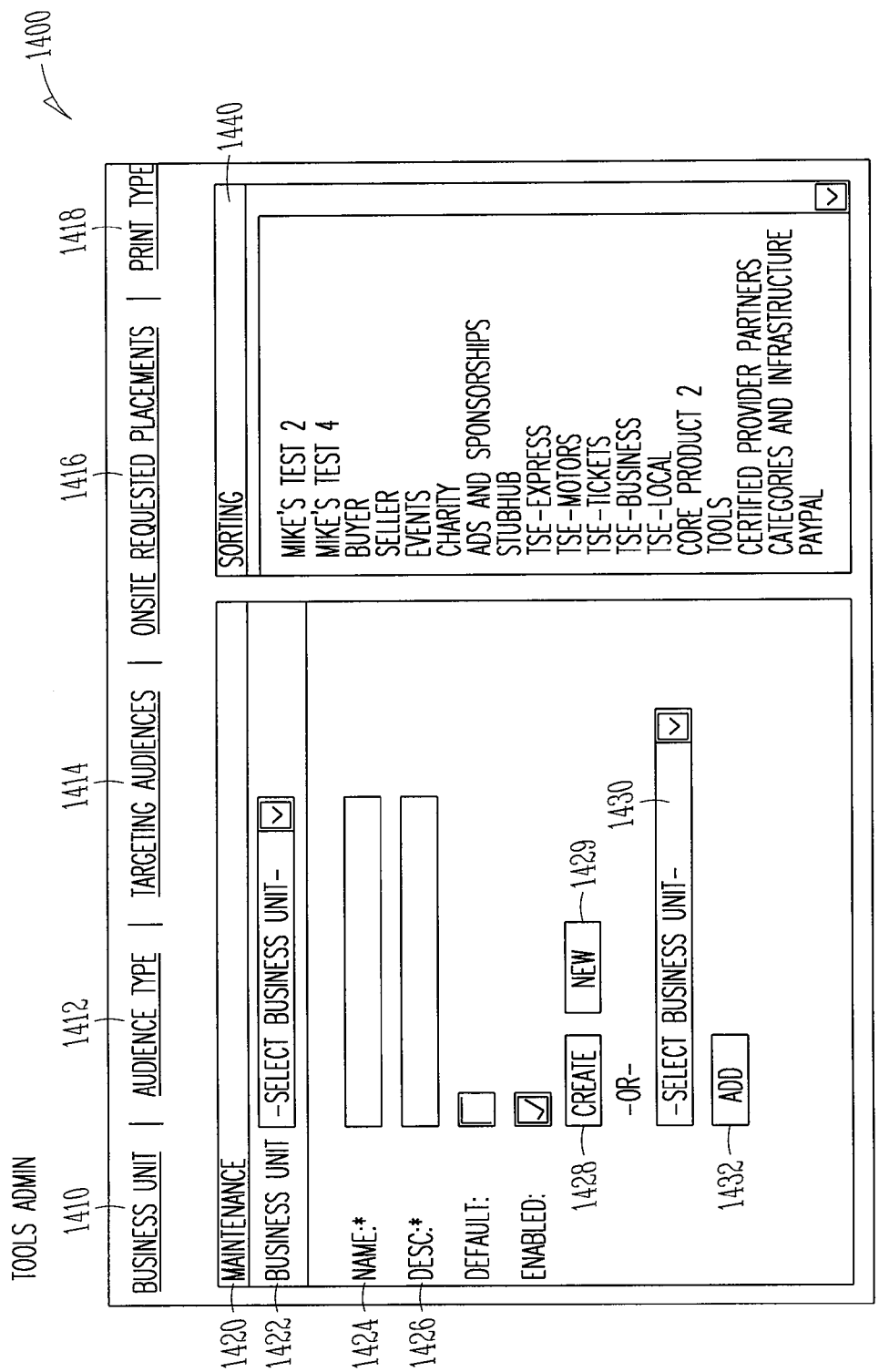
FIG. 14 shows a screenshot illustrating an example embodiment of a tools administration page.

FIG. 14 shows a screenshot illustrating an example embodiment of a tools administration page 1400. The tools administration page 1400 includes business unit tab 1410; audience type tab 1412, to create audience types or inactivate them; targeting audiences tab 1414, to create or inactivate targeting audiences; onsite requested placements tab 1416, to create or inactivate onsite placements; and print type tab 1418, to create or inactivate print types. The page also includes maintenance portion 1420 and a sorting portion 1440. Under the maintenance portion 1420, the user may either select a business unit 1422 from a list or enter a name 1424 and a description 1426.

The page also provides a create button 1428 and a new button 1429. By pressing the create button 1428 and the new button 1429, the user may create a new business unit or may select a business unit from the dropdown box 1430 and press the add button 1432 to add the new business unit. The sorting portion 1440 may facilitate sorting the business units in any desired arrangement.

Thus, a computerized method and system for marketing planning and marketing program development have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized method for marketing planning and marketing program development, the method comprising:
   receiving a marketing program proposal including program information;
   facilitating a strategic review process of the marketing program proposal;
   receiving a marketing program, the marketing program being based on the marketing program proposal, the receiving of the marketing program including receiving a project proposal for a project, the project proposal being based on the marketing program; and
   facilitating a capacity review process of the marketing program;
   wherein the receiving a marketing program proposal, facilitating a strategic review process, receiving a marketing program, and facilitating a capacity review process are performed with a processor and storage.

2. The computerized method of claim 1, wherein the facilitating of the strategic review includes presenting the marketing program proposal to a reviewer for review and receiving a review result from the reviewer.

3. The computerized method of claim 1, wherein the facilitating of the strategic review includes receiving an approval of the marketing program proposal.

4. The computerized method of claim 1, wherein the facilitating of the capacity review process includes determining whether the project proposal is approved.

5. The computerized method of claim 1, including facilitating a management of the marketing program.

6. The computerized method of claim 5, wherein the facilitating of the management of the marketing program includes developing a high-level detail involved in the marketing program.

7. The computerized method of claim 1, including facilitating of a management of a tactical detail of the project including at least one of resources or timelines.

8. The computerized method of claim 7, wherein the facilitating of the management of the project includes tying strategies to tactics including monitoring Return On Investment (ROI) from various levels.

9. The computerized method of claim 7, wherein the facilitating of the management of the project includes producing a creative deliverable and trafficking the creative deliverable through a delivery mechanism.

10. The computerized method of claim 9, wherein the delivery mechanism includes at least one of an e-mail delivery, a Web site development, or a publishing house.

11. A computer system comprising:
a memory to store data; and
at least one computer processor in communication with the memory, the at least one computer processor to facilitate marketing planning and marketing program development including;
a plurality of modules executable by at least one of the at least one computer processor, the modules including
a request module to receive a marketing program proposal including program information;
a strategic review module to facilitate a strategic review process of the marketing program proposal, the strategic review module to determine whether the marketing program proposal is approved;
a project definition module, the project definition module being responsive to a determination that the marketing program proposal is approved, and using the marketing program proposal to facilitate defining a project for a marketing program;
a capacity review module to facilitate a capacity review process of the project for the marketing program;
a management module to facilitate the management of the marketing program and the project, the management module to produce a creative deliverable; and
a delivery module to deliver the creative deliverable through a delivery mechanism.

12. The system of claim 11, wherein the strategic review module is to disseminate the proposal to a reviewer for review and to receive a review result from the reviewer.

13. The system of claim 11, wherein the capacity review module is to determine whether the project is approved.

14. The system of claim 13, wherein the management module is to facilitate a management of the project based on the determination that the project is approved.

15. The system of claim 11, wherein the management module is to manage a tactical detail, the tactical detail including at least one of resources or timelines.

16. The system of claim 11, wherein the management module is to ne a strategy to tactic.

17. The system of claim 11, wherein the management module is to monitor return on investment (ROI) from various levels.

18. The system of claim 11, wherein the management module is to produce a creative deliverable.

19. The system of claim 11, wherein the delivery mechanism includes at least one of an e-mail delivery, a Web site development, or a publishing house.

20. The system of claim 11, wherein the program information includes at least one of an e-mail, a Web site graphic, a Web site page, or a print piece.

21. The system of claim 11, including a user interface to display information and receive user inputs.

22. The system of claim 12, wherein, wherein the review result includes at least one of a red, a yellow, or a green rating or a feedback comment.

23. A computerized system for marketing planning and marketing program development, the system comprising:
a computer processor and storage configured to store and execute a programming module for receiving a marketing program proposal including program information;
a programming module for facilitating a strategic review process of the marketing program proposal;
a programming module for receiving a marketing program, the marketing program being based on the marketing program proposal, the receiving of the marketing program including receiving a project proposal for a project, the project proposal being based on the marketing program;
a programming module for facilitating a capacity review process of the marketing program;
a programming module for facilitating a management of the marketing program, the management of the marketing program including producing a creative deliverable; and
a programming module for trafficking the creative deliverable through a deliver mechanism.

24. A non-transitory machine-readable medium comprising instructions, which when implemented by one or more processors perform the following operations:
receiving a marketing program proposal;
presenting the marketing program proposal to a first reviewer;
receiving an approval of the marketing program proposal from the first reviewer;
receiving a marketing program, the marketing program being defined based on the marketing program proposal, the marketing program including a project proposal for a project, the project proposal being based on the marketing program;
presenting the marketing program to a second reviewer for a capacity review of the marketing program;
receiving feedback from the second reviewer, the feedback being used to finalize the marketing;
recording an assigning of resources to a final marketing program;
receiving reports related to the marketing program; and
presenting information related to the final marketing program.

* * * * *